United States Patent [19]

Fathi

[11] 3,940,526

[45] Feb. 24, 1976

[54] BRACED INSULATING ELEMENT AND METHOD FOR ITS MANUFACTURE

[75] Inventor: Houchang Fathi, Trondheim, Norway

[73] Assignee: Sintef, Trondheim, Norway

[22] Filed: May 15, 1974

[21] Appl. No.: 470,319

[30] Foreign Application Priority Data
May 15, 1973 Norway.............................. 2006/73

[52] U.S. Cl. .................... 428/117; 52/404; 428/310
[51] Int. Cl.² ......................................... B32B 3/12
[58] Field of Search ............ 161/36, 38, 68; 52/404, 52/408; 156/166; 428/117, 310

[56] References Cited
UNITED STATES PATENTS

| | | | |
|---|---|---|---|
| 3,230,995 | 1/1966 | Shannon ........................ | 161/36 UX |
| 3,274,046 | 9/1966 | Shannon et al. ...................... | 161/36 |
| 3,339,326 | 9/1967 | Derr et al. ............................ | 161/38 |
| 3,342,665 | 9/1967 | Shannon .............................. | 161/36 |
| 3,345,241 | 10/1967 | Shannon .............................. | 161/36 |

OTHER PUBLICATIONS
Rose, The Cond. Chem. Dict. 7th Ed., 1966.

*Primary Examiner*—William E. Schulz
*Attorney, Agent, or Firm*—Wenderoth, Lind & Ponack

[57] ABSTRACT

The invention relates to insulating elements particularly intended for use as a supporting core material in wall structures and the like, e.g. of the sandwich type. The insulating element consists of an insulating body of a non-supporting material such as mineral wool, which is intersected by a plurality of parallel, relatively thin sheet-formed bracing members of a stiffer material, such as polyester, polyethylene or the like, imparting to the element improved rigidity in one or more directions. The invention also relates to a beneficial method of producing such insulating elements, the method mainly comprising placing mats of the non-supporting insulating material in layers with intermediate coatings of the stiffer bracing material, and then cutting or dividing the assembled layers into slices with a thickness corresponding to the desired thickness of the insulation.

5 Claims, 6 Drawing Figures

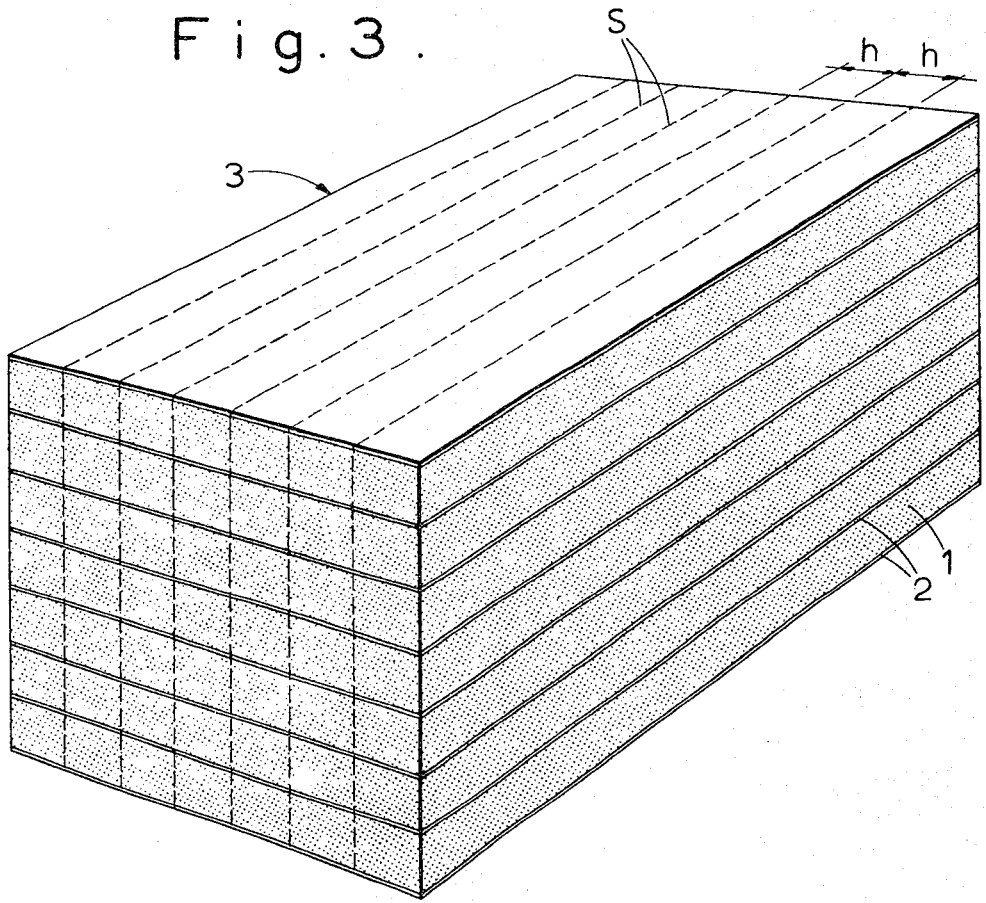
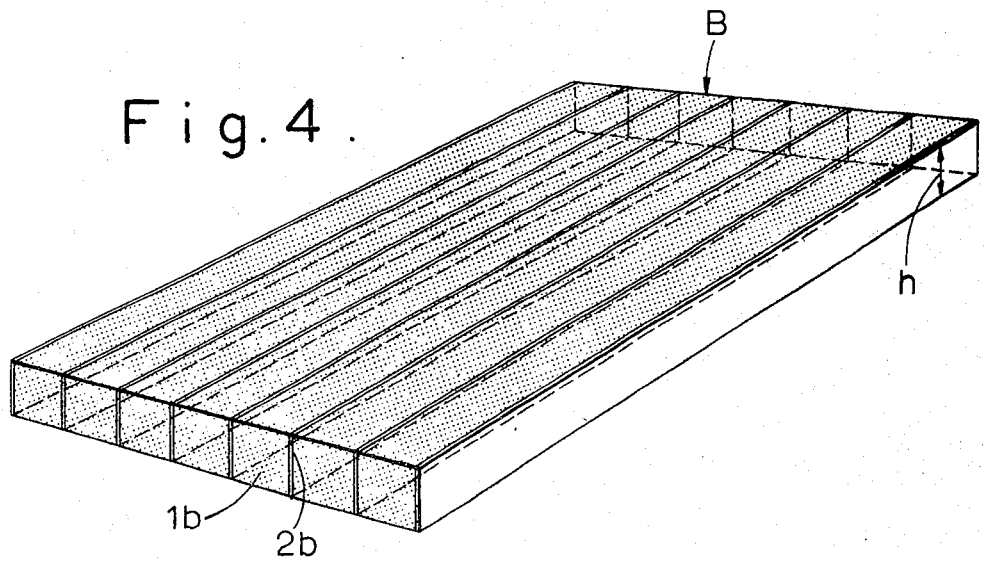

BRACED INSULATING ELEMENT AND METHOD FOR ITS MANUFACTURE

BACKGROUND OF THE INVENTION

The present invention relates to an insulating element, particularly as used in prefabricated wall structures and the like, as a supporting and insulating core material, and a beneficial method for the manufacture of such supporting insulating elements.

Known insulating elements of this type may consist of plates of self-supporting, porous light weight materials, for example foam plastics. Although such materials usually have good insulation properties their use as a core material is limited by their insufficient shear strength properties and relatively low rigidity. If sufficient strength properties are to be obtained, the self-supporting insulating material must have a relatively high weight per volume, thus resulting in heavier and more expensive structures.

Cheap insulating materials such as mineral wool do not have any supporting properties at all, and if such materials are employed as core material in prefabricated wall structures or the like, the structure must be braced by supporting elements, such as ribs, corrugated plates, honeycomb structures or the like, made from a stiffer material which transmits the shear forces between the outer surfaces of the structure, the cavities between the supporting and bracing elements being filled with the soft insulating material. This requires a rather complicated process when producing the wall structures, and in addition as seen from the point of view of fire safety, it is disadvantageous in that the free insulating material easily drops out in case the outer plates catch fire or melt.

SUMMARY OF THE INVENTION

The object of the present invention is to provide an insulating element wherein cheap materials with good insulating properties, but with poor strength properties, such as mineral wool or foamed plastics with low weight per volume, are combined with supporting bracing elements in a rational manner, and continuously bonded thereto, such that the disadvantages and drawbacks involved in previously known insulating elements are avoided, and a technically and economically beneficial method for the manufacture of the novel insulating element.

This object is accomplished according to the invention by means of an insulating element and a method as disclosed below.

BRIEF DESCRIPTION OF THE DRAWINGS

In order that the invention may be more clearly understood a detailed description thereof will be given below with reference to the drawings in which:

FIG. 3 illustrates a step in the production of a second embodiment of insulating elements according to the invention.

FIG. 4 illustrates the second embodiment of the invention.

DETAILED DESCRIPTION OF THE INVENTION

Figure 1:
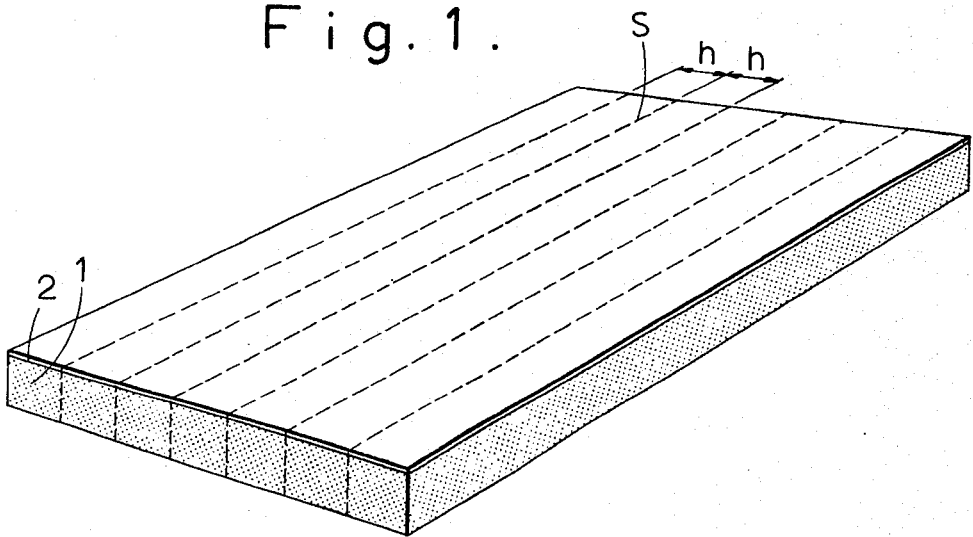
FIG. 1 illustrates a first step in the production of insulating elements according to the invention.

As basic material in the production process is used a rectangular sheet or a mat 1 of soft non-supporting (i.e., having very low strength properties) insulating material, such as mineral wool. The insulating mat may be of a common type with standard dimensions, i.e., having a thickness up to about 10 cm. On one of its flat sides the mat 1 in a known manner is provided with a relatively thin coating 2 of a stiffer, yet flexible material, for instance polyester or the like, i.e., a coating which is rigid in the general plane of the coating and flexible in a direction perpendicular thereto. The plastic is applied preferably in liquid form, for instance by spraying or spreading, such that the plastic coating 2 after setting is fixedly adhered to the adjacent insulating material 1. If desired preformed plates of the stiffer material my also constitute the coating 2 which then is bonded to the insulating material for example by means of an adhesive.

The insulating mat 1 with applied coating 2 is then cut or divided normal to the coating 2 along parallel lines s into identical, parallelepipedic strips, each of which thus consists of an insulating part 1a and a coating or bracing part 2a of width h corresponding to the desired thickness of the insulating layer of the wall structure for which the element is intended.

Figure 2:
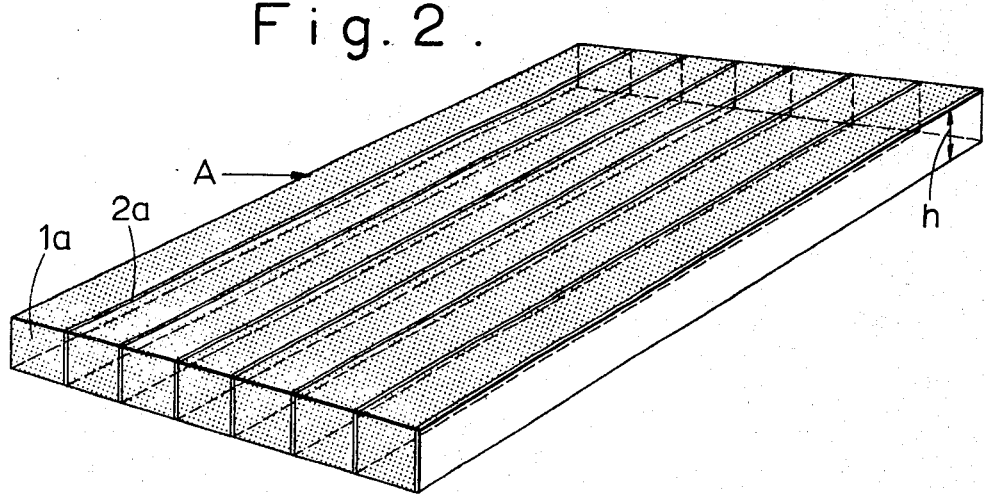
FIG. 2 illustrates a first embodiment of an insulating element according to the invention.

A predetermined number of the thus cut out strips are then placed adjacent each other as shown in FIG. 2, in such a manner that the coating or bracing part 2a of each strip forms a backing against an uncovered side face of an adjacent strip.

The adjacent strips 1a, 2a, when provided with outer facings or panels for use in a wall structure or the like, thus constitute an insulating element A which is orthotropically braced, i.e., braced in one cross direction.

FIG. 3 illustrates a step in the manufacture of a second embodiment of an insulating element according to the invention. Here a predetermined number of sheets or mats 1 of the non-supporting insulating material are placed above each other in a stratified manner with intermediate coatings 2 of the stiffer material, each coating 2 being fixedly bonded to adjacent layers of insulating material 1. The building up of the layers is preferably accomplished by applying liquid plastic in known manner on the lowermost mat layer, as described above in connection with FIG. 1, and then placing the next insulating layer upon the plastic layer 2 before this has set, and by repeating the process for each new insulating mat 1 placed on top. If desired, also in this case the coating 2 may consist of preformed sheets of an appropriate material which suitably is bonded to the insulating material.

The thus formed parallelepipedic body 3 is then cut or divided normal to the coatings 2 along parallel lines s into a plurality of slices each of which constitutes an insulating element B as shown in FIG. 4, with thickness h corresponding to the desired thickness of the insulation. The second embodiment B of the insulating element according to the invention is thus equal to the first embodiment A as described above in connection with FIGS. 1 and 2, except that the individual strips 1b with bracing layers 2b in the second embodiment B are continuously coherent, and thus the element constitutes a self-supporting unit prior to the application of outer panels. If desired one or more of the uncovered or exposed surfaces of the parallelepipedic body 3 extending normal to the cutting plane may be provided with a coating of the stiffer material prior to the cutting or dividing operation. Thereby it will be achieved that the cut out insulating element B will have bracing layers 2b along all four edge faces thereof.

Figure 5:
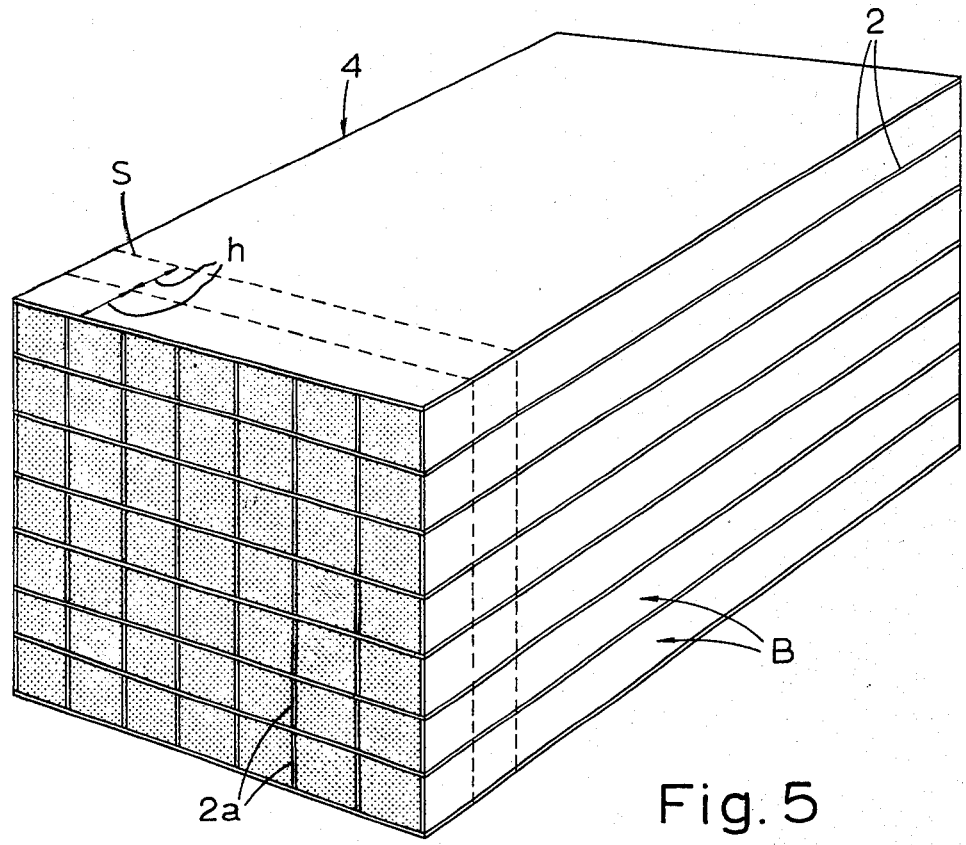
FIG. 5 illustrates a step in the production of a third embodiment of insulating elements according to the invention.

FIG. 5 shows a step in the manufacture of a third embodiment of the invention. Here a predetermined number of insulating elements B according to the second embodiment of the invention shown in FIG. 4 or, if desired, of insulating elements A according to the first embodiment shown in FIG. 2, are placed in layers above each other with intermediate coatings 2 of the stiffer material, preferably plastic, in the same manner as explained in connection with the manufacture of the second embodiment B, i.e., in connection with FIG. 3. The parallelepipedic body 4 thus produced is then divided into slices along parallel planes s normal to the first bracing layer 2a cutting through the elements B (or A) as well as to the lastly applied coating 2 on the flat sides of the elements B (or A), the thickness of the slices being equal to the desired thickness of insulation.

Figure 6:
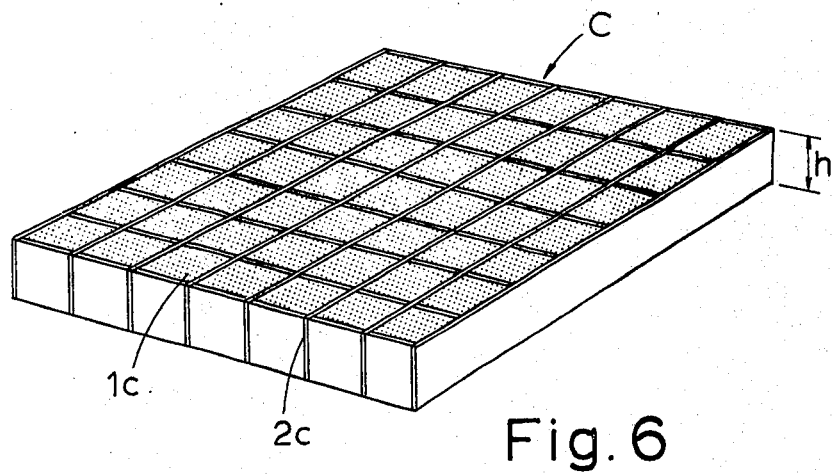
FIG. 6 illustrates the third embodiment of the invention.

The resulting cut out slices or insulating elements C, as shown in FIG. 6, thus consist of quadrangles or cells 1c of soft insulating material enclosed by and fixedly bonded to bracing ribs 2c extending in parallel planes in orthogonal directions. Also in the manufacturing of this embodiment C coatings of the stiffer material may be applied to the uncovered surfaces of the parallelepipedic body 4 prior to division into slices C, such that the cut out insulating elements C will have bracing ribs 2c along all edge faces thereof.

The embodiment of the invention hereinbefore described have an advantageous light weight structure which, as a result of the intersecting relatively stiff coating parts, is braced in a direction parallel to the plates of the coating ribs, the necessary rigidity in the general plane of the insulating element being provided by the areal extention of the mat. The insulating elements are thus self-supporting and easily handled during further fabrication of wall structures or the like. The insulating element according to the third embodiment C of the invention having orthogonally intersecting coating ribs is particularly advantageous in that it is braced in all directions (orthotropically braced).

Furthermore, the method according to the invention as described above, is especially advantageous in that it permits a very rational manufacture of the insulating elements and is well adapted for an automatic production process. An additional advantage of the method according to the invention is that the more advanced embodiments of the invention each builds upon the production step of a less advanced embodiment, such that at different steps in the production process insulating elements are provided with different properties regarding stiffness, supporting ability and dimensions, and also regarding price. It is also possible to select that embodiment of the insulating element according to the invention which is the most suitable for the particular requirements.

It should be noted that the sheet formed coatings 2 which constitute the bracing of the insulating elements, are relatively thin and flexible in a direction normal to the sheet plane. Thus the insulating element according to the invention is not compareable to known insulating elements in which the bracing comprises a framework of relatively thick, stiff and unelastic ribs.

I claim:

1. A braced insulating element, particularly for use as a core material in a wall structure, said element comprising:
   a first plurality of parallelly spaced bracing members;
   a second plurality of parallelly spaced bracing members;
   said first and second pluralities of bracing members extending orthogonally and intersecting each other to form therebetween a plurality of closed quadrangular cells;
   each of said cells being filled by a building insulating material having low strength properties;
   said bracing members being rigid in directions of the respective planes thereof and individually flexible in directions perpendicular to said respective planes;
   said bracing members being continuously bonded to the respective adjacent insulating material;
   said element having a pair of major surfaces extending in planes perpendicular to said planes of said bracing members, said major surfaces being formed substantially by said insulating material; and
   said element having plural edge surfaces extending perpendicular to said major surfaces, each of said edge surfaces being formed by a bracing member.

2. A method for manufacturing a braced insulating element, particularly for use as a core material in a wall structure, said method comprising:
   providing a plurality of parallelepipedshaped mats formed of a building insulating material having low strength properties;
   applying a first adhesive coating to at least one surface of each of said mats;
   stacking the thus coated mats in layers one above the other to form a first body;
   cutting said first body perpendicular to said layers to form first slices each formed of a number, equal to said plurality, of strips of insulating material separated by strips of said first adhesive coating;
   applying a second adhesive coating to at least one surface of each of said first slices;
   stacking the thus coated first slices in layers one above the other to form a second body; and
   cutting said second body in a direction perpendicular to said strips of said first adhesive coating and to the planes of said second adhesive coatings to form second slices, each comprising a braced insulating element formed of a plurality of quadrangular-shaped portions of insulating material separated by layers of adhesive coating.

3. A method as claimed in claim 2, wherein said first and second adhesive coatings are applied in a viscous state.

4. A method as claimed in claim 2, further comprising applying said first and second adhesive coatings in sufficient amounts to form rigid bracing members upon hardening thereof.

5. A method as claimed in claim 2, further comprising inserting a sheet of reinforcement material into said first and second adhesive coatings.

* * * * *